United States Patent [19]

Lee

[11] Patent Number: 5,200,686
[45] Date of Patent: Apr. 6, 1993

[54] METHOD AND APPARATUS FOR DETERMINING BATTERY TYPE

[75] Inventor: Steven S. Lee, Northbrook, Ill.

[73] Assignee: Motorola, Inc., Schaumburg, Ill.

[21] Appl. No.: 774,435

[22] Filed: Oct. 10, 1991

[51] Int. Cl.$^5$ .................. H02J 7/00; H01M 10/44
[52] U.S. Cl. .................................. 320/2; 320/15; 429/7
[58] Field of Search ............... 320/2, 15; 455/89, 90; 429/7

[56] References Cited

U.S. PATENT DOCUMENTS

| | | | |
|---|---|---|---|
| 3,659,180 | 4/1972 | Urbush | 320/2 |
| 4,006,396 | 2/1977 | Bogut | 320/2 |
| 4,593,409 | 6/1986 | Miller | 320/48 X |
| 4,670,703 | 6/1987 | Williams | 320/15 X |
| 4,680,527 | 7/1987 | Benenati et al. | 320/2 |

*Primary Examiner*—R. J. Hickey
*Attorney, Agent, or Firm*—John W. Hayes

[57] ABSTRACT

Battery type is determined by measuring effective resistance of a thermistor/resistor network (205, 206, and 207) and one or more of a plurality of current sources (303–305) is enabled to provide the appropriate charging current. Measurement of necessary charging parameters and provision of appropriate charging current are accomplished through an interface to the battery pack undergoing charge that comprises only three connections (313–315).

6 Claims, 1 Drawing Sheet

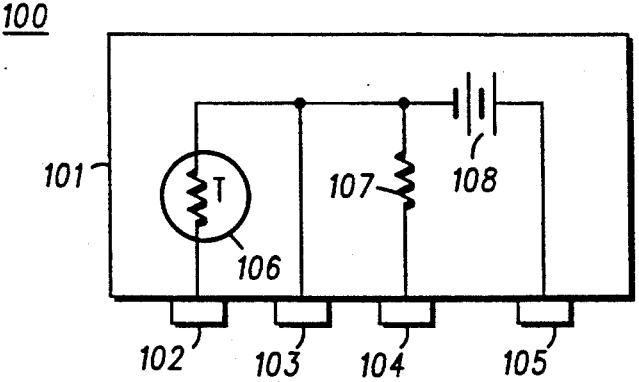
FIG.1 —PRIOR ART—
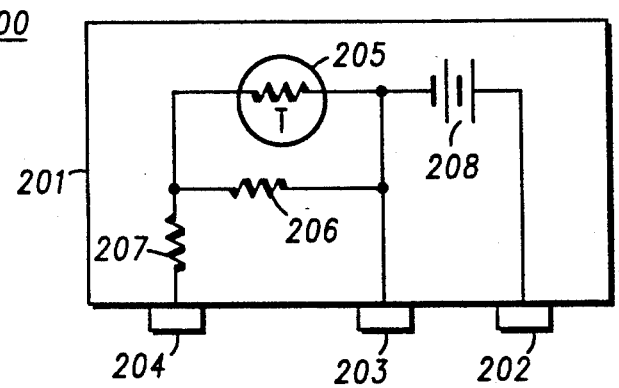
FIG.2
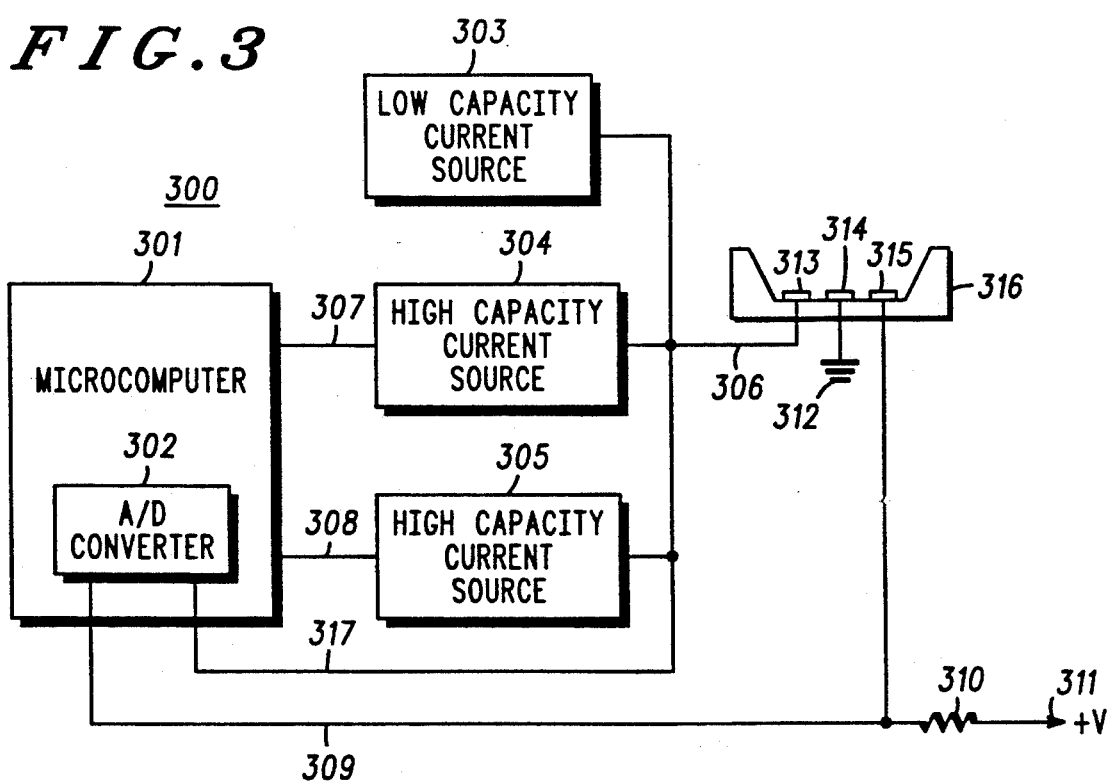
FIG.3

METHOD AND APPARATUS FOR DETERMINING BATTERY TYPE

TECHNICAL FIELD

This invention relates generally to battery powered equipment and in particular to battery chargers, and is more particularly directed toward a method and apparatus for distinguishing between different types of batteries.

BACKGROUND OF THE INVENTION

Since the advent of two-way radio communication, designers have been faced with the challenge of making radio equipment smaller and smaller. The ultimate goal has been to reduce equipment size to the point where it is easy for an individual user to carry and operate it. Any unit intended to be carried by an individual is usually designated as portable, and communication units designed for extremely small size and ease of use are often termed "personal" communication units.

Of course, units designed for the individual user are generally equipped with batteries, since it is assumed that it would be inconvenient to require the user to search for a power source before commencing communication. Indeed, it is the "ready-to-use" nature of portable equipment that constitutes perhaps its greatest appeal.

Naturally, an associated integral battery may add undesired size and weight to portable equipment. But, since battery size and battery capacity are generally directly proportional to one another, frequent users are more tolerant of increased battery size and weight because these users need more "talk time" and "standby time" than infrequent users. The term "talk time," when applied to portable communication units, generally refers to battery life measured while the transmitter portion of the communication unit is active. "Standby time" refers to battery life measured while the communication unit is in a powered-on state, but with the transmitter inactive.

Still, the majority of portable equipment users, and not a small number of frequent users, stress the small size and weight aspects of portable equipment when making a purchase decision. Thus, considerable pressure still exists on designers to make even highcapacity battery assemblies as compact as possible.

Most battery assemblies intended for portable use are designed to be rechargeable to maximize user convenience. It is much more economical to place a battery assembly (or battery pack, as it is sometimes called) into a charger for a period of time than to be compelled to purchase new batteries every time battery voltage drops below a useful level. Extant rechargeable battery packs generally include four contacts disposed on a convenient exterior surface for compatibility with a battery charger. These contacts permit electrical access to components that help to determine, among other things, the desired charge rate for a given battery pack and when the battery is adequately charged. This contact arrangement is an important factor in determining how small a battery pack can be, since exterior surface area must be maintained to accommodate the external contact array.

Accordingly, a need arises for a method for effectively reducing the number of contacts required so that a corresponding reduction may be effected in battery size, weight, cost, and complexity. Of course, this contact reduction must not affect the ability to measure critical battery charging parameters.

SUMMARY OF THE INVENTION

This need and others are satisfied by the method of the present invention for determining battery type and adjusting charging parameters accordingly for a battery charger system having only three terminals for interconnection between a battery charger and a battery pack to be charged. First, the effective resistance of a thermistor/resistor network connected between two of the terminals is measured to determine battery type, then one or more of a plurality of current sources, coupled to a third terminal, are enabled to provide an appropriate charging current.

In one embodiment, the measurement of effective resistance is accomplished by measuring voltage at one terminal, with a fixed resistance connected between that terminal and a relatively constant voltage. An analog-to-digital converter (ADC) is used to make this voltage measurement, and a microcomputer controls the selection of the appropriate current source or sources. In the preferred embodiment, the ADC is included within the microcomputer.

BRIEF DESCRIPTION OF THE DRAWINGS

FIG. 1 depicts a battery pack of the prior art;

FIG. 2 illustrates a battery pack constructed to operate in the battery charger system of the present invention; and FIG. 3 is a block diagram of a battery charger that may be used to implement the method of the present invention.

DESCRIPTION OF A PREFERRED EMBODIMENT

A battery pack of the prior art is illustrated in FIG. 1, generally depicted by the numeral 100. The battery pack is provided with four relatively closely-spaced contacts (102-105) disposed on an exterior surface of the battery pack housing (101). One contact (105) is coupled to an array of rechargeable battery cells (108), generally of nickel cadmium construction, although other materials may also be used. The battery cells (108) are also coupled to a common contact (103).

An internal resistor (107) is shown coupled between a dedicated resistor contact (104) and the common contact (103). The value of this internal resistor (107) is measured by external charging equipment to determine battery type and associated charging rate. In general, a particular manufacturer will assign specific resistor values to specific battery types in order to ensure compatibility between that manufacturer's batteries and its charging equipment.

A thermistor (106) is connected between a dedicated contact (102) and the common contact (103). As is well-known in the art, a thermistor is a resistor whose value varies in a predictable fashion in response to temperature. Since the thermistor (106) is placed in close proximity to the rechargeable battery cells (108), thermistor resistance represents an accurate measure of battery cell temperature.

Cell temperature is an important parameter in the battery charging art. As is well-known, a nickel cadmium battery is commonly charged by supplying a known current to the battery. For rapid charging, a relatively large current is supplied, which causes cell temperature to increase. In one method of charging control, called the temperature cut-off method, when the cells reach a predetermined temperature the charging mode is changed from rapid charge to trickle charge. From a practical standpoint, this means that the relatively large current used for rapid charging is reduced to a relatively small current. For example, a high capacity battery of 1200 milliampere-hour (mAh) capacity would commonly be rapid charged with a current of 1200 milliamperes (mA). When the cells reach their predetermined temperature, the current is reduced to only 80 mA for trickle charging mode.

A more effective charging control protocol is the delta T method. Delta T refers to the fact that the rate of change of temperature is measured to determine optimum charging of a cell, as opposed to measuring a limit temperature as in the temperature cut-off method. Of course, in order to implement the delta T technique, the battery charger requires a greater degree of sophistication.

The parameters mentioned above (i.e., cell temperature and battery type) are required to properly recharge a nickel cadmium cell. Through the present invention, these parameters can still be measured properly with only three interconnections between a battery pack and associated charger, thus allowing a smaller battery pack to be constructed.

FIG. 2 illustrates a battery pack, generally depicted by the numeral 200, designed for use in the battery charging system of the present invention. The battery pack (200) includes first, second, and third contacts (202, 203, and 204, respectively) disposed upon an exterior surface (201). An arrangement of one or more rechargeable cells (208) is provided between the first and second contacts (202 and 203). A thermistor (205) and a first resistor (206), are connected in parallel, with one end of the parallel combination coupled to the second contact (203). The other end of the parallel combination is coupled to the third contact (204) through a second resistor (207). The second contact (203) serves as a common contact, and would generally be connected to ground potential during recharging operations.

The battery pack of FIG. 2 operates in conjunction with the battery charger shown in block diagram form in FIG. 3, and generally depicted by the number 300. In order to make proper contact with a battery pack to be charged, a battery charger is normally equipped with a pocket (316). This pocket is generally nothing more than a depression in the battery charger housing in which contacts (313-315) arranged to mate with corresponding battery pack contacts are disposed. The pocket is normally designed to accommodate a portable communication unit with battery attached, although many configurations are possible. Some chargers will accept a battery pack alone, without the associated portable equipment, and various physical orientations of the unit undergoing charging, such as upright, horizontal, or inclined, are contemplated in battery charger designs known in the art. The contacts shown in FIG. 3 are designed to mate with the contacts of FIG. 2 such that the first contact (202) of the battery pack (200) connects to the first contact (313) of the battery charger (300), the second contact (203) of the battery pack (200) connects to the second contact (314) of the battery charger (300), and the third contact (204) of the battery pack (200) connects to the third contact (315) of the charger (300).

A plurality of current sources (303-305) can be selectively enabled to provide proper charging current in a manner to be discussed in more detail below. A current source can be constructed using discrete transistors and resistors by anyone having ordinary skill in the art.

Determination of battery type, as described in a preceding section, is ordinarily accomplished by measuring the value of a resistor internal to the battery pack being charged. Another way to determine resistance is to place the unknown resistance in a voltage divider network with one or more known resistances to which a known voltage is applied. This technique is used in the preferred embodiment of the invention through the use of a known resistance value (310) coupled to a known supply voltage (311). An analog-to-digital converter (302) is coupled (309) to the first contact (315) of the pocket (316) to measure the voltage across the thermistor/resistor network (205-207) described with reference to FIG. 2 above.

Judicious selection of resistor values permits battery type to be accurately determined despite resistance fluctuations caused by the temperature dependence of the thermistor's resistance. Since the values of the fixed resistors (206 and 207) in the network are known, variations in resistance can be accurately associated with cell temperature. Of course, computation of resistor value and cell temperature parameters is relatively simple in the preferred embodiment, since computation and control are performed by a microcomputer (301). Preferably, the microcomputer is an MC6805R2 microcomputer manufactured by Motorola, Inc. The microcomputer (301) includes an analog-to-digital converter (ADC) (302) and can be easily programmed by one of ordinary skill in the pertinent art to perform measurement, calculation, and control functions. Initial battery voltage can also be measured by the ADC (302) through a dedicated input (317) for determination of initial cell charge state. If a cell is not discharged, application of full rapid charge current would be inappropriate.

Resistance values and corresponding battery types are stored in microcomputer (301) memory. When the battery type has been identified, the microcomputer (301) enables, through control signal outputs (307 and 308), appropriate current sources (307 and 308) to implement the indicated charging mode. The low capacity current source (303) is always enabled, since its small current output has little impact on the rapid charge current for a given battery type. For a battery identified as a high capacity battery, the microcomputer would enable both high capacity current sources (304 and 305) to provide the relatively high current required to rapid charge a high capacity battery. For a battery identified as lower capacity, only one of the current sources (304) would be enabled, since rapid charging a lower capacity battery requires less current. In the preferred embodiment, two battery types are possible. For the high capacity battery, rated at 1200 mAh, both current sources (304 and 305) are enabled. Each current source provides a current of 600 mA, yielding a total current of 1200 mA. The lower capacity battery, rated at 600 mAh, requires only one current source (304) during rapid charge mode. For either battery type, once the battery is charged, the high capacity current sources are disabled by the microcomputer (301) leaving only the low capacity current source (303) to provide a current of 80 mA for trickle charge mode.

What is claimed is:

1. A battery charger apparatus comprising:

a battery pack having first, second, and third contacts disposed upon an exterior surface, the battery pack including:

one or more rechargeable cells arranged between the first and second contacts;

a thermistor and a first resistor in parallel combination, with one end of the combination connected to the second contact;

a second resistor connected between the other end of the combination and the third contact;

a battery charger including:

a pocket having first, second, and third contacts, the pocket constructed and arranged so that the first, second, and third contacts of the pocket operably engage the first, second, and third contacts, respectively, of the battery pack;

a plurality of current sources that may be enabled individually or in combination, the current sources coupled to the first contact of the pocket;

means for measuring voltage coupled to the third contact of the pocket;

controller means, coupled to the plurality of current sources and to the means for measuring voltage, for selectively enabling one or more of the current sources in response to the measured voltage.

2. The apparatus of claim 1, wherein the means for measuring voltage comprises an analog-to-digital converter.

3. The apparatus of claim 1, wherein the controller means comprises a microcomputer.

4. The apparatus of claim 3, wherein the microcomputer includes an analog-to-digital converter.

5. The apparatus of claim 1, wherein the plurality of current sources includes a current source of relatively small capacity applicable to trickle charging.

6. The apparatus of claim 1, wherein the plurality of current sources includes at least two current sources of relatively high capacity that may be selectively enabled, either individually or together, to provide rapid charge capability for batteries of different types.

* * * * *